United States Patent
Stephan et al.

(10) Patent No.: US 6,223,904 B1
(45) Date of Patent: May 1, 2001

(54) CONTINUOUS PROCESS FOR RECOVERING RAW MATERIALS FROM COATED FOILS, DEVICE FOR CARRYING OUT THIS PROCESS AND FOIL MATERIALS RECOVERED THEREBY

(75) Inventors: Oskar Stephan, Hockenheim; Franz Weingart, Leimen; Uwe Burkhardt, Frankenstein; Heino Thiele, Ludwigshafen; Lothar Schwarz, Oberkirch; Norbert Müller, Friedelsheim; Jochen Eicher, Wachenheim, all of (DE)

(73) Assignee: EMTEC Magnetics GmbH, Ludwigshafen (DE)

( * ) Notice: Subject to any disclaimer, the term of this patent is extended or adjusted under 35 U.S.C. 154(b) by 0 days.

(21) Appl. No.: 09/029,009

(22) PCT Filed: Aug. 26, 1996

(86) PCT No.: PCT/EP96/03761
§ 371 Date: Oct. 8, 1998
§ 102(e) Date: Oct. 8, 1998

(87) PCT Pub. No.: WO97/07952
PCT Pub. Date: Mar. 6, 1997

(30) Foreign Application Priority Data

Aug. 30, 1995 (DE) .............................................. 195 31 886

(51) Int. Cl.[7] .............................. B03B 1/00; B03B 7/00; B01D 17/00
(52) U.S. Cl. ................................ 209/3; 209/10; 209/12.1; 210/775
(58) Field of Search .......................... 209/2, 3, 10, 12.1, 209/17; 210/775, 805; 366/168.1

(56) References Cited

U.S. PATENT DOCUMENTS

| 2,833,630 | * | 5/1958 | Loevenstein | 366/168.1 |
| 4,568,612 | | 2/1986 | Lehner et al. | 428/425 |

(List continued on next page.)

FOREIGN PATENT DOCUMENTS

| 4407800 | of 0000 | (DE) . |
| 4330889 | 3/1995 | (DE) . |

(List continued on next page.)

OTHER PUBLICATIONS

Mishra et al., Process and Apparatus for de–oiling mill scale waste materials, PCT Application #WO 92/14849, all pages pertinent, Sep. 3, 1992.*

*Primary Examiner*—Donald P. Walsh
*Assistant Examiner*—Daniel K Schlak
(74) *Attorney, Agent, or Firm*—Keil & Weinkauf

(57) ABSTRACT

Continuous recovery of raw materials from coated films and apparatus for this purpose and film material recovered therewith. Large amounts of coated films can be fed to a continuous recycling process in which any pigments present in the coating and the substrate material are recovered. The treatment is carried out at room temperature in an alkaline medium consisting of soft soap, organic solvent and/or water, with or without the use of a catalyst. The solvent is recycled. After the first treatment stage, the film shreds can be treated in a second stage with a solvent/water mixture similarly to the first stage, and thorough final washing in a water or solvent circulation is effected in a third stage. The recovered film shreds are dried, pressed, milled and brought to the desired shape in a plastics agglomerator, and the recovered pigments are dried under reduced pressure (FIG. 1). The process and apparatus can be used with advantage for any type of substrate or printed media, for example for magnetic substrates, photographic substrates, printing plates, pigment-free substrates.

16 Claims, 2 Drawing Sheets

U.S. PATENT DOCUMENTS

| | | | |
|---|---|---|---|
| 4,830,188 | * | 5/1989 | Hannigan et al. ......... 209/3 |
| 5,066,388 | * | 11/1991 | Ross ..................... 209/170 |
| 5,246,503 | | 9/1993 | Minick ................... 134/38 |
| 5,518,621 | * | 5/1996 | Holcombe et al. ......... 210/770 |

FOREIGN PATENT DOCUMENTS

| | | |
|---|---|---|
| 2130124 | 5/1984 | (GB) . |
| 53-070404 | of 1978 | (JP) . |
| 53-092879 | of 1978 | (JP) . |
| 53-112979 | of 1979 | (JP) . |
| 79/06985 | of 1979 | (JP) . |
| 54-066985 | 5/1979 | (JP) . |
| 57-146624 | of 1982 | (JP) . |
| 58/054050 | of 1983 | (JP) . |
| 62-167601 | of 1987 | (JP) . |
| 63-317707 | of 1988 | (JP) . |
| 01112413 | of 1989 | (JP) . |
| 6238667 | 8/1994 | (JP) . |
| 89/03614 | of 1989 | (KR) . |

* cited by examiner

CONTINUOUS PROCESS FOR RECOVERING RAW MATERIALS FROM COATED FOILS, DEVICE FOR CARRYING OUT THIS PROCESS AND FOIL MATERIALS RECOVERED THEREBY

FIELD OF THE INVENTION

The present invention relates to a continuous process for recovering raw materials from finely chopped wastes of coated films, consisting of a polymeric substrate and a coating or print present thereon, in which furthermore pigments may be dispersed in a crosslinked or uncrosslinked binder matrix, the substrate material and, if required, the pigments being recovered by treatment in a liquid medium. The present invention furthermore relates to apparatuses for carrying out the process and to film material recovered by means of the process.

BACKGROUND OF THE INVENTION

In recent years, the rapid growth of the information industry has resulted in extensive consumption of large amounts of printing plates, photographic films and magnetic storage media, such as computer tapes, audio tapes, video tapes and floppy disks. In particular, magnetic tapes and floppy disks which have, for example, polyethylene terephthalate as the substrate have been produced in growing amounts in recent years, owing to their excellent magnetic and mechanical properties. In general, residues and wastes of such storage media occur in large amounts in the production and during use by the end users. At present, such wastes are disposed of by depositing them with the domestic waste in sanitary landfills or incinerating them in incineration furnaces. From the point of view of waste reduction and the recovery of useful materials, full utilization of such wastes is an outstanding requirement.

A process of the generic type stated at the outset is disclosed in DE-A 33 41 608. According to this publication, magnetic tape wastes are finely shredded, after which the magnetic layer and the substrate are delaminated in aqueous alkaline solution and the magnetic powder is then separated from the substrate by stirring at high speed. This process requires a very complicated bulky apparatus and a large amount of energy, since the treatment liquid must be heated to at least 90° C.

Further processes which are based on separation of the magnetic layer from the substrate by treatment with a base are described in Japanese Patent Applications 112 979 (1978), 006 985 (1979), 070 404 (1978), 092 879 (1978) and 167 601 (1987) and Korean Patent Application 89/03614. Japanese Patent Applications 317 707 (1988), 112 413 (1989) and 146 624 (1982) describe separation by treatment with an acid. Japanese Patent Application 054 050 (1983) describes the use of a solvent mixture comprising phenol and tetrachloroethane for delamination of the magnetic layer.

U.S. Pat. No. 5,246,503 discloses a delamination solution for ink coatings which consists of organic solvent, water, thickener and wetting agent, where in addition the coating has to be removed mechanically by scratching.

If it is intended to delaminate the pigmented binder layer and the substrate and the aim is to recover the useful materials, in particular the pigment and the polyethylene terephthalate, the PET film should as far as possible not be chemically degraded or attacked. If, on the other hand, polyurethanes crosslinked in the magnetic layer are used, as described, for example, in European Patent 0,099,533, as binders, the processes described above are for the most part unsuccessful or give unsatisfactory results with regard to separation, delamination and recovery.

DE-A 43 30 889 of the same applicant describes a process for recovering raw materials from magnetic recording media, in which the latter in finely chopped form are treated in organic solvents, an acid which is soluble therein and alcohols or thioalcohols and, if required, surfactants at elevated temperatures, the magnetic layer delaminated in this manner being separated from the substrate by a washing process, and thereafter both the finely chopped substrate wastes and the magnetic powder being dried. The essential feature of this process is that the ester groups of the polyurethane binder are cleaved by hydrolysis by the stated treatment medium, whereas at the same time the ester groups of the polyethylene terephthalate substrate are not chemically destroyed. It has been found that it is difficult in this process to fulfil these boundary conditions; furthermore, the finely chopped wastes must be treated for many hours in order to achieve complete separation.

German Application DE-A 44 07 900 of the same applicant describes a process for recovery as in the abovementioned application, the finely chopped wastes being treated in a solution consisting of potassium salt of polyunsaturated fatty acids, one or more organic solvents and/or water with mechanical action and thereafter the detached magnetic powder being separated from the substrate by washing or settling out or in a magnetic separator. This process, too, requires the use of elevated temperatures in the range of 60–95° C., can only be carried out as a batch process and thus does not permit relatively large amounts of coated films to be treated in an economically optimum manner.

JP-A-6238667 describes a continuous process in which the shredded magnetic tape wastes are divided into substrate film and magnetizable particles with the aid of a heated treatment solution, such as aqueous solutions of NaOH, surfactant-containing solutions, organic solvents or mixtures thereof The magnetic tape wastes are first transported in the separation kettle filled with treatment solution, stirred there for a few minutes and then fed to a mixer which accelerates the separation. Film particles and magnetizable particles are separated in a rotary sieve and the particles are filtered out of the treatment solution. The treatment solution purified in this manner is recycled to the separation kettle. This process likewise requires a great deal of energy since the treatment solution must be heated to 70–80° C.

It is an object of the present invention to provide a process of the generic type stated at the outset and apparatus therefor, which process can be carried out at room temperature, the treatment solution being recovered and it being possible to recycle the raw materials from large amounts of coated films.

SUMMARY OF THE INVENTION

We have found that this object is achieved by a continuous process for recovering raw materials from finely chopped wastes of coated films, consisting of a polymeric substrate and a coating or print present thereon, in which pigments may be dispersed in a crosslinked or uncrosslinked binder matrix, the substrate material and, if required, the pigments being recovered by treatment in a liquid medium, the coated film wastes being fed from a first storage container and a first delamination solution, consisting of one or more surfactants or salts thereof, one or more organic solvents or water, with or without the addition of basic catalysts, from a second storage container to a first flow mixer, the film shreds then being separated from the excess delamination solution and the solution being recycled to a second storage container for settling or after the solids suspended in it have settled out, wherein the process is carried out at room temperature and the film shreds treated in the first circulation are fed to a second flow mixer, to which a second delamination solution is metered, and then separated from said solution, the solution being separated from solid components and being recycled to the second flow mixer and the delaminated film shreds arriving from the first or second circulation are transferred to a wash unit and washed or sprayed there with a delamination solution, preferably water or solvent, arriving from a circulation system, and the treatment liquid is separated from solid components and recycled to the circulation.

Further details of the invention are evident from the figures and the description.

SHORT DESCRIPTION OF THE DRAWINGS

The present invention is described with reference to the figures, in which

PREFERRED EMBODIMENTS OF THE INVENTION

Figure 1:
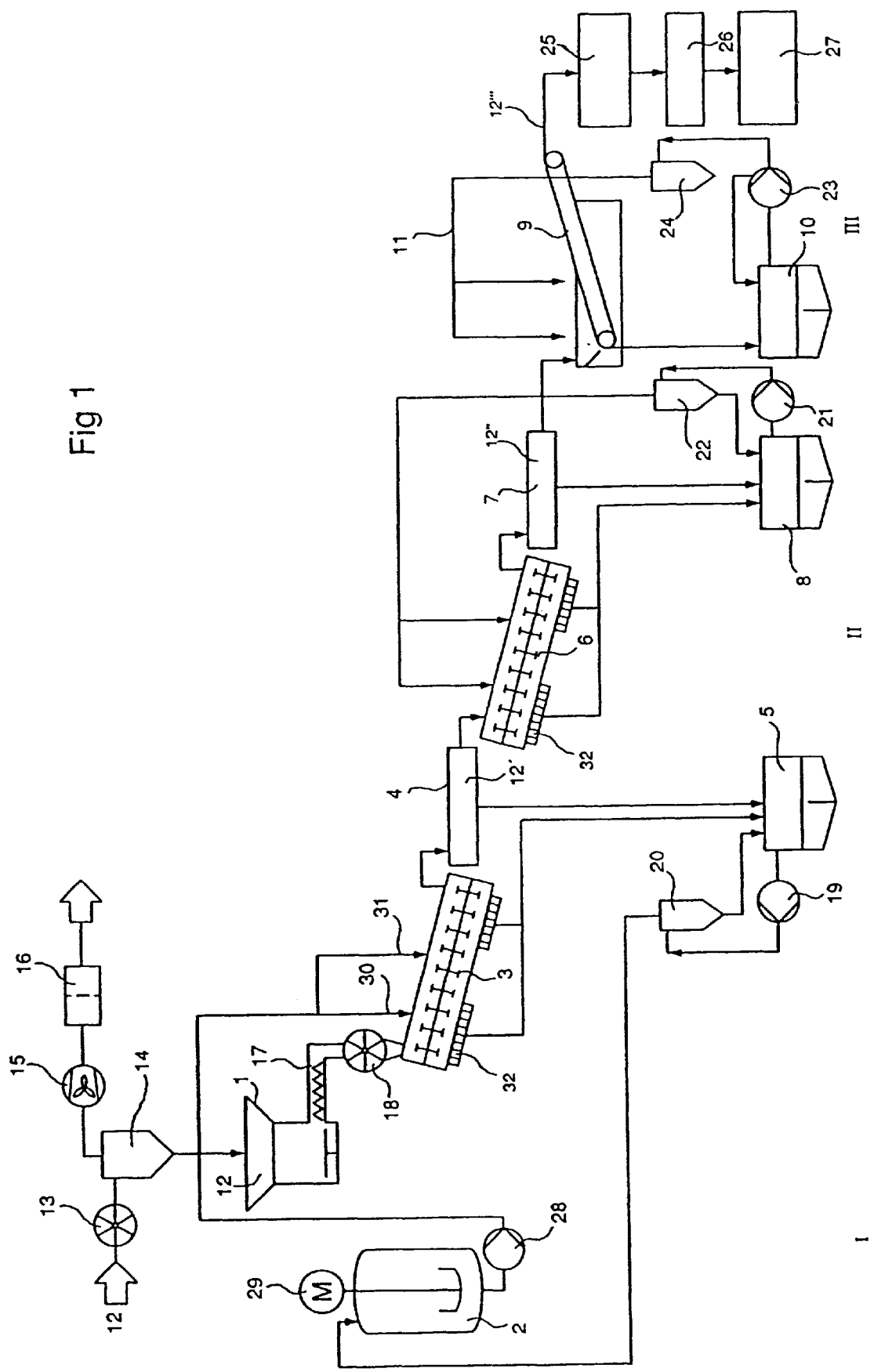
FIG. 1 shows a three-stage sequence according to the present invention

First, one embodiment of the novel process will be described with reference to FIG. 1, this embodiment being carried out for delamination of the films in three circulations I, II and III.

The product (12) to be delaminated, for example a printed or coated recording medium, such as a magnetic tape or a photographic film, is chopped into small pieces of defined length, preferably 0.5–10 cm, in a cutter mill (13). Comminution gives rise to small amounts of cutting dust, which is separated from the larger shreds in a separator (14) downstream of the cutter mill. A gas cyclone in which separations are effected by centrifugal forces is used as the separator in the example according to FIG. 1. The exit air from the cyclone (14) is extracted via a pipe by means of a fan (15) and a filter (16), purified and then blown away as waste air. The shreds (12) then enter a storage container (1) and are transported from this by a discharge apparatus (17) and a metering apparatus (18), for example a star feeder, into the first flow mixer (3) for delamination. The delamination solvent is passed from the storage container (2) into this flow mixer. The container (2) is stirred by means of a stirrer (29). The delamination composition is metered by means of a metering pump (28) and may enter the flow mixer (3) at one or more, preferably two or more, points (30, 31).

The liquid delamination composition is essentially the same as that described in the abovementioned German Patent Application DE-A 44 07 900. It consists of one or more organic surfactants or salts thereof, one or more organic solvents and/or water and, if required, a catalyst.

The surfactant compound may be, for example, a potassium salt of polyunsaturated acids (trivial name soft soap) or a mixture of phosphates, surfactants and complexing agents (tradename Mukasol®). The surfactant may be ionic or nonionic.

Suitable organic solvents include N-methylpyrrolidone, dimethylformamide, dimethyl sulfoxide, methyl ethyl ketone, dibutyl ether, tetrahydrofuran, 1,4-dioxane, acetone, cyclohexanone, toluene, xylene, chloroform, butylglycol, ethylglycol, ethyl acetate, methylene chloride, trichloroethylene, isopropanol, methanol, ethanol, butanone and tetrachloroethane and in particular mixtures thereof and mixtures with water.

Basic compounds, such as sodium methylate, potassium tert-butylate, the sodium salt of ethyl oxaloacetate or dimethylaminopyridine, have proven particularly useful catalysts, but o-butyl titanate and NaOH are also suitable as additives.

In addition, further surfactants may be used, in combination with the abovementioned components, for delamination of the magnetic layer. Examples of suitable further surfactants are higher fatty acids or oxo alcohols which have been alkoxylated with ethylene oxide, propylene oxide or butylene oxide, so that they are soluble or dispersible in the solvent system, for example C-13 or C-15 oxo alcohol ethoxylated with ethylene oxide.

The composition described above works substantially in the alkaline range.

The flow mixer (3) is motor-operated and contains, in its interior, blades for mixing shreds and delamination compositions. In order to increase the throughput, it may be installed horizontally or with an inclination of 90°, preferably from 5° to 45°, in the direction of flow. As will be evident from the subsequent examples, the throughput time of the film shreds is in general a few minutes at normal room temperature. The throughput time is determined by the speed of the flow mixer, its inclination, the treatment temperature, the throughput of solvent and the amount of introduced shreds to be delaminated. The treatment temperature is preferably room temperature but may also be increased to the boiling point of the liquid medium.

The delaminated shreds (12') then enter a separation apparatus, for example a transport sieve (4), from which the solvent is passed through a pipe into the settling tank (5). The excess solvent filtered off from the first flow mixer (3) via a filter (32) also enters this tank via one or more pipes. In the settling tank, the pigments detached from the coating can collect as a result of gravitational force, magnetic pigments being caused to settle out, for example, by attraction by a magnetic field. The solvent is pumped out of the settling tank by means of a pump (19) and fed to a separation means (20) for separation of liquid and solid components, for example a hydrocyclone operating with centrifugal force, from which the solid components are recycled to the settling tank (5) while the liquid medium is fed again via a pipe to the first solvent container (2), so that in this way a complete cycle (I) has been achieved. If necessary, separation of the solid components may also be effected in the solvent container (2).

Since the composition of the delamination medium may change during treatment of the film shreds, the storage container is connected to a regulation apparatus which is not shown and serves for potential measurement or conductivity measurement and which monitors the composition of the returning solution and if necessary restores the desired composition by adding one or more substances, so that the delamination composition can once again enter the circulation (I).

If complete delamination of the film shreds has been achieved in this first circulation, at the same time the substrate material, for example polyethylene terephthalate, having the required purity, which can be readily determined by visual inspection or analytical tests, the film shreds (12') reaching the transport sieve are immediately subjected to the final treatment, which is described in more detail further below.

Otherwise, the film shreds are fed to a second circulation II, consisting of a second flow mixer (6), which has the same design as the first one. The film shreds (12') are fed to said flow mixer, in a mixture of organic solvent and/or water, which comes from a closed-ciruit pipe, are also metered in at one or more points. In other respects, the treatment is the same as that described for the first circulation. The film shreds (12") which have been purified in this manner and from which the major part of adhering pigment or binder residues have been removed then enter a second transport sieve (7). The excess solvent from the second flow mixer and the transport sieve enters a second settling tank (8), which has the same purpose as the first settling tank and from which the solvent or solvent mixture is recycled by means of a pump (21) and a second separation apparatus (22) to the circulation, so that it is suitable for further use in the second flow mixer (6). If necessary, an intermediate buffer tank (not shown) can be included, similarly to the first circulation.

If this wash/purification apparatus too fails to provide sufficient purity of the film shreds, the latter pass from the second transport sieve (7) into a third circulation III, consisting of a conveyor belt (9) on which the film shreds are washed or sprayed with water jets or solvent. This medium passes via a third settling tank (10), for settling out remaining solid residues, and via a pump means (23) into a third separation apparatus (24) and then back into the closed-circuit pipe (11).

The finally purified and delaminated film shreds (12''') thus obtained are fed to a drying/pressing apparatus (25), then finely milled in a mill (26) and finally fed to a plastic agglomerator (27), where they are brought into the desired state for their further intended use.

The recovered delaminated film shreds can be further processed in the following manner:

Reuse as end product, for example in the case of polyethylene terephthalate as raw material for the production of fibers, films, nonwovens, geotextiles or other shaped plastics articles.

Reuse as raw material, for example in the case of polyethylene terephthalate
  by partial glycolysis and use of the resulting product as a polyol for polyurethane preparation, for example rigid foam
  by complete glycolysis/methanolysis and use of the resulting product as raw material for further polyester synthesis.

The washed-out pigments obtained from the settling tanks (5, 8, 10), for example colored pigments or magnetic powder, are freed from the solvent, dried under reduced pressure and reused.

The pigments can be dried by solvent treatment in superheated vapor form, which may avoid agglomeration. Drying of the pigments is carried out, for example, in a paddle dryer in which the pigments are thoroughly mixed with application of heat and reduced pressure.

Further preferred embodiments of the novel process are described with reference to FIGS. 2–4. The common feature of this flow mixer shown is that it has a multi-stage design so that the liquid treatment media or delamination compositions, which in the example of FIG. 1 are fed in three separate circulations to single-stage flow mixers or wash units, in this case enter in succession into a single flow mixer consisting of a plurality of chambers, but the remaining parts of the particular circulation (not shown) may be exactly as shown in FIG. 1.

As described further below, three process zones can be created within the mixer by means of such a multistage flow mixer which consists, for example, of three stages or chambers:

Stage 1: partial dissolution and delamination
Stage 2: Delamination and washing
Stage 3: Washing FIG. 2 shows a three-stage double-walled flow mixer which is inclined at an angle of about 15° in the direction of flow. A continuous stirring shaft (59) which has a feed screw (42) in the inflow region (43) of the film shreds and is provided with blades (45) in the other three chambers (56, 57, 58) is driven by means of a motor (41). Similarly to the first circulation in FIG. 1, the first delamination composition enters the first chamber (56) of the three-stage flow mixer through the feed (44) and is thoroughly mixed with the film shreds in the direction of flow by means of the blades. The cross-section of this first chamber narrows conically in the transport direction. By means of additional circular baffles (47) installed in the chambers, the residence time of the film shreds and hence the required intensity of shred treatment can be adjusted. The inflow region provided with the abovementioned feed screw may effect partial dissolution of the coating. As is furthermore evident from FIG. 2, the flow mixer is double-walled, a perforated blade (46) as an inner jacket having a conical shape like the outer jacket being arranged coaxially thereto. Owing to the centrifugal forces generated by the blades (45), the coating is separated off with the solvent stream through the perforated blade and discharged through the orifice (48) at the end of the first chamber.

The film shreds then enter the second chamber (57), which is designed similarly to the first chamber. This second chamber is preferably fed with a solvent mixture as in circulation II in FIG. 1, similarly to the first chamber. Finally, the shreds enter the third chamber (58), where they are preferably washed with water or solvent, similarly to circulation III. The abovementioned second and third chambers, too, are each provided with feed orifices (49, 51) and discharge orifices (50, 52) for the solvent and the water and are likewise fed with the delamination medium in the direction of flow of the shreds. The shreds then enter an end chamber which is provided with a discharge orifice (54) and in which a discharge blade (53) connected to the stirring shaft is arranged. Said blade may be in the form of, for example, a rake or perforated plate in order to minimize solvent discharge.

Separation apparatuses (55), for example in the form of perforated disks, may be present between the individual chambers (56, 57, 58) in order to regulate the flow of solvent and shreds into the next chamber in each case.

After discharge of the shreds from the mixer described, the delaminated film shreds are further treated as described above.

Figure 2:
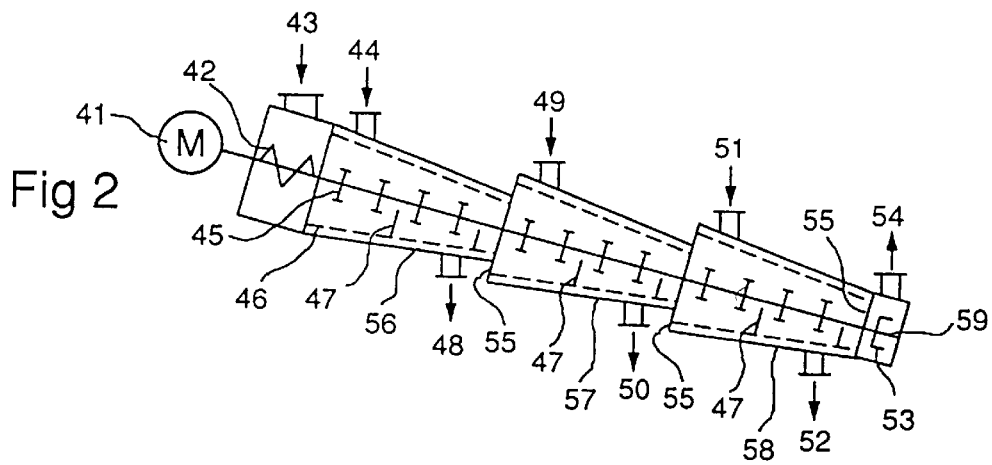
FIG. 2 shows a section through a three-stage double-walled flow mixer based on the cocurrent principle
Figure 3:
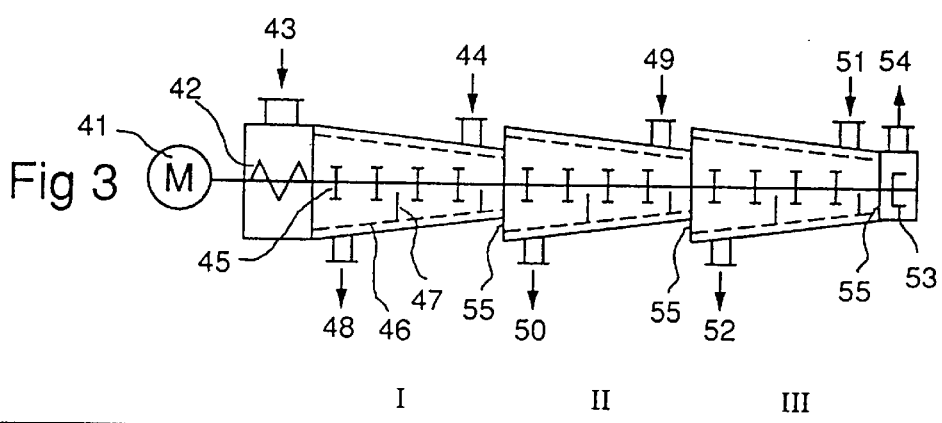
FIG. 3 shows a section through a three-stage double-walled flow mixer based on the countercurrent principle

FIG. 3 shows a flow mixer which is likewise a three-stage and double-walled mixer and has the same design as that shown in FIG. 2, except that the delamination compositions or solvents and detergents are introduced countercurrent through the feeds (44, 49, 51) which are arranged in the three chambers (56, 57, 58) and in each case at the end of each chamber, and the liquid laden with delamination sludge is then removed in each case through the discharge orifices (48, 50, 52) arranged at the beginning of each chamber. In this arrangement, the flow mixer need not be inclined in the running direction but is preferably arranged horizontally.

Figure 4:
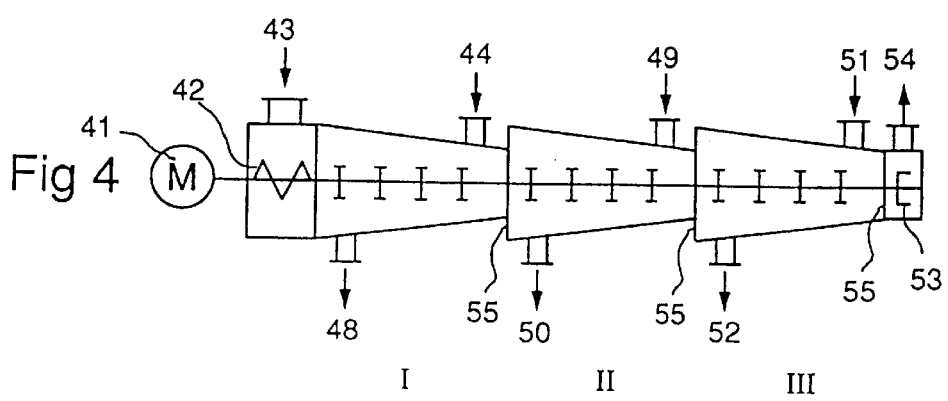
FIG. 4 shows a section through a three-stage flow mixer based on the decanter principle

Finally, FIG. 4 shows a three-stage flow mixer based on the decanter principle, in which the delamination compositions are likewise introduced countercurrent but in which no baffles are arranged in the chambers and instead, owing to the centrifugal forces, the detached coating is preferably fed, countercurrent to the transport of the film shreds, to the discharge orifices. This described flow mixer, too, is preferably operated in horizontal arrangement.

Further arrangements of a flow mixer of similar design are of course also possible. For example, the flow mixer may consist only of two chambers while circulation III according to FIG. 1 is retained unchanged. If required, more than three chambers for delamination of the coating of the film shreds are also possible.

The novel process is described below with reference to the magnetic tape to be delaminated, but the invention is not restricted thereto.

The film shreds were finely chopped magnetic tape material, consisting of a commercially available PET substrate film coated with a magnetic dispersion having the following composition

| | Parts by weight |
|---|---|
| Finely divided acicular $CrO_2$ | 11 |
| High molecular polyurethane | 1.6 |
| Vinyl copolymer VAGH | 0.6 |
| Lubricant | 0.04 |
| Dispersant | 0.2 |
| Crosslinked polyisocyanate | 0.4 |
| Solvent | 23 |

The dispersion was cast on a nonmagnetic 15 μm thick polyethylene terephthalate substrate having a drying thickness of 3.5 μm by means of a conventional extrusion coater, then dried, calendered and subjected to a subsequent heat treatment. For the production of video tape, the coated films were slit into half inch widths (1.27 cm) in the longitudinal direction.

EXAMPLE 1

A solution of 18 kg of soft soap in 96 kg of methanol was prepared in a stirred kettle; 500 kg of a 1:1 tetrahydrofuran/dioxane mixture were added to the solution. 1.5 l of 15% strength aqueous NaOH solution were added as the catalyst. The delamination solution thus prepared was fed to a flow mixer which was inclined at 15° in the flow direction, had a volume of 40 l, contained various loosening and and compaction zones and was equipped with mixing blades which were operated at 1000 rpm, the solvent flow rate being 12 l/min. At the same time, film shreds were metered into the flow mixer at a rate of 1 kg/min. The film shreds had an average length of 3 cm. The arrangement was otherwise as shown in FIG. 1.

The treatment composition in the second circulation was a 1:1 tetrahydrofuran/dioxane mixture and that in the third circulation was tap water, which was sprayed on at 0.3 bar. The average residence times in the first and second flow mixers were each 2.5 minutes at room temperature. Thereafter, the film shreds had been completely delaminated except for a few microscopically small pigment points.

EXAMPLE 2

The procedure was as in Example 1, except that the solvent flow rate was 27 l/min in the first circulation. In this case, the average residence time of the film shreds in the first mixer was 1.1 minutes, the product quality being the same as that achieved in Example 1.

EXAMPLE 3

The procedure was as in Example 1, except that the catalyst NaOH was omitted in the first treatment medium. The average residence time in the first mixer had to be increased to 5 minutes in order to achieve the same product quality as in Example 1.

EXAMPLE 4

The procedure was as in Example 3, except that the treatment temperature in the first mixer was brought to 60° C. Thereafter, the product quality achieved was the same as that in the preceding examples, with an average residence time of 2.5 minutes in the first mixer.

EXAMPLE 5

The procedure was as in Example 1, except that, in the first treatment medium, the soft soap was replaced by the same amount of Mukasol®. After an average residence time of 3 minutes in the first mixer, the product quality of the film shreds was the same as that achieved in the preceding experiments.

EXAMPLE 6

The three delamination solutions in the first, second and third circulations were as described in Example 1, except that a three-stage flow mixer based on the countercurrent principle as shown in FIG. 3 was used, said mixture being arranged horizontally and its first, second and third chambers each having a volume of 20 l. 5 kg/min of film shreds were fed to the mixer, and 50 l/min of the first delamination solution were fed through the first inlet, 10 l of solvent laden with the coating emerging from the first outlet. The feed in the second chamber was 10 l/min and the discharge was 50 l/min; in the third chamber, the feed of water was 50 l/min and the discharge 45 l/min. Here too, complete delamination and separation of the coating residues of the film shreds were achieved.

COMPARATIVE EXAMPLE

The procedure was as in Example 1, except that the soft soap was omitted. No delamination could be achieved even when the residence time of the film shreds in the first mixer was increased to 15 minutes.

The product quality of the recovered polyethylene terephthalate was determined by measuring the residual chromium content and the solution viscosity (cf Table). The colour number may also be stated for determining the product quality.

TABLE

| | Delamination[a] | Cr content [ppm][b] | $n_{spez}$ [ml/g][c] |
|---|---|---|---|
| Example 1 | 1 | 25 | 66 |
| Example 2 | 1 | 25 | 66 |
| Example 3 | 2 | 30 | 67 |
| Example 4 | 1 | 25 | 64 |

TABLE-continued

|  | Delamination[a] | Cr content [ppm][b] | $n_{spez}$ [ml/g][c] |
|---|---|---|---|
| Example 5 | 2 | 25 | 66 |
| Example 6 | 1 | 20 | 66 |
| Comparative Ex. | 4 | — | 60 |

Similar delamination results were obtained when polyethylene naphthalate or cellulose acetate was used as the substrate material or a photographic coating was to be removed instead of the magnetic coating. It was also possible to delaminate printing plates, pigment-free coatings and printed polyethylene terephthalate films.

We claim:

1. A continuous process for recovering raw materials from finely chopped wastes of coated films, consisting of a polymeric substrate and a coating or print present thereon, in which pigments may be dispersed in a crosslinked or uncrosslinked binder matrix, the substrate material and, optionally, the pigments being recovered by treatment in a liquid medium, the coated film wastes being fed from a first storage container, and a first delamination solution, consisting of one or more surfactants or salts thereof, one or more organic solvents or water, with or without the addition of basic catalysts, from a second storage container to a first flow mixer in a first treatment stage, wherein intense mixing is effected, film shreds then being separated from excess delamination solution, and the solution being recycled to a second storage container for settling or after solids suspended in it have settled out, wherein the process is carried out at ambient temperature and the film shreds treated in the first treatment stage are fed to a second flow mixer in a second treatment stage, to which second flow mixer a second delamination solution is metered and intense mixing is effected, and then separated from the second delamination solution, the second delamination solution being separated from solid components and being recycled to the second flow mixer and delaminated film shreds arriving from either of the first or second treatment stages are transferred to a wash unit and washed or sprayed there with a third delamination solution arriving from a circulation system, and treatment liquid is separated from solid components and recycled to the circulation system.

2. A process as claimed in claim 1, wherein at least two different delamination solutions are used.

3. A process as claimed in claim 2, for recovering raw materials from magnetic recording media, wherein the polymeric substrate is a PET film and the coating or print is a $CrO_2$-containing magnetic coating or print.

4. A process as claimed in claim 1, wherein the composition of at least one delamination solution is tested by means of potential or conductivity measurement and, optionally the composition is adjusted by aromatic addition of one or more ingredients.

5. An apparatus for recovering raw materials from finely chopped wastes of coated films, the coated films comprising a polymeric substrate and a coating or print thereon containing pigments dispersed in a crosslinked or uncrosslinked binder matrix, the apparatus comprising:

means for transferring the finely chopped wastes of the coated films from a first storage container into a flow mixer for delamination;

the flow mixer comprising a plurality of interconnected chambers, each of the interconnected chambers being assigned to a delaminating/washing circuit and having an inlet orifice for receiving a delaminating/washing liquid and an outlet for discharging the delaminating/washing liquid, and means in each chamber for intensely mixing finely chopped wastes or delaminated shreds and the delaminating/washing liquid; and means for transferring the finely chopped wastes or delaminated shreds into a next interconnected chamber of the flow mixer;

the apparatus further comprising in a first delaminating circuit:

means for transferring a delaminating liquid from a second storage container into an inlet orifice of a first interconnected chamber of the flow mixer;

means for separating delaminated shreds or finely chopped wastes from excess delaminating liquid in a first chamber of the flow mixer, coupled with means for transferring excess delaminating liquid from the first chamber of the flow mixer to a first settling tank;

means for separating pigments from delaminating liquid in a first settling tank, coupled with means for removal of the separated pigments from the first settling tank;

means for recirculating delaminating liquid from the first settling tank into the second storage container;

means for testing the composition of the delaminating liquid by potential or conductivity measurement;

the apparatus further comprising in a second delaminating circuit:

means for separating further delaminated shreds from excess delaminating liquid in a second interconnected chamber of the flow mixer, coupled with means for transferring excess delaminating liquid from the second chamber of the flow mixer to a second settling tank;

means for separating pigments from delaminating liquid in a second settling tank, coupled with means for removal of the separated pigments from the second settling tank;

means for recirculating delaminating liquid from a second settling tank into the second interconnected chamber of the flow mixer;

the apparatus further comprising in a third washing circuit means for separating further delaminated shreds from excess mixture of delaminating liquid and water in a third interconnected chamber of the flow mixer, coupled with means for transferring excess mixture of delaminating liquid and water from the third interconnected chamber of the flow mixer to a third settling tank;

means for separating pigments from the mixture of delaminating liquid and water in the third settling tank, coupled with means for removal of the separated pigments from the third settling tank;

means for recirculating the mixture of delaminating liquid and water from the third settling tank into the third interconnected chamber of the flow mixer;

the apparatus further comprising means for drying delaminated and washed shreds which have been removed from the third interconnected chamber of the flow mixer and from which delaminated and washed shreds delaminating/washing liquid has been separated therefrom; and means for comminuting the dried delaminated shreds followed by treatment in a plastic agglomerator.

6. Apparatus as claimed in claim 5, wherein the chambers contain motor-operated blades and baffles.

7. Apparatus as claimed in claim 5, wherein the flow mixer has, in its interior adjacent to the outer wall, coaxial perforated plates for separating the coating from the film shreds.

8. Apparatus as claimed in claim 5, wherein each of the chambers has means therein for moving the delamination composition cocurrently or countercurrently to the transport direction of the film shreds.

9. Apparatus as claimed in claim 5, wherein the flow mixer is inclined by from 5 to 90° relative to the horizontal in the transport direction.

10. Apparatus as claimed in claim 5, wherein the chambers narrow in the direction of flow.

11. An apparatus for recovering raw materials from finely chopped wastes of coated films, the coated films comprising a polymeric substrate and a coating or print thereon containing pigments dispersed in a crosslinked or uncrosslinked binder matrix, the apparatus comprising:

means for transferring the finely chopped wastes of the coated films from a first storage container into a first flow mixer for delamination;

the first flow mixer having at least one inlet orifice for receiving a delaminating liquid and at least one outlet orifice for discharging the delaminating liquid, and means for intensely mixing the finely chopped wastes and the delaminating liquid;

means for transferring a first delaminating liquid from a second storage container into the at least one orifice of the first flow mixer;

means for separating delaminated shreds of the finely chopped wastes from excess first delaminating liquid in the first flow mixer, coupled with means for transferring the separated excess first delaminating liquid from the first flow mixer to a first settling tank;

means for removing delaminated shreds from the first flow mixer, communicating with means for (a) separating the delaminated shreds from the first delaminating liquid adhered thereto and (b) transporting the separated first delaminated liquid to the first settling tank;

means for separating pigments from the first delaminating liquid in the first settling tank, coupled with means for removing the separated pigments from the first settling tank;

means for transferring delaminated shreds along with first delaminating liquid from the first flow mixer into a second flow mixer for further delamination of delaminated shreds;

the second flow mixer having at least one inlet orifice for receiving a delaminated liquid and at least one outlet orifice for discharging the delaminating liquid, and means for mixing the delaminated shreds and the second delaminating liquid;

means for separating further delaminated shreds from excess second delaminating liquid in the second flow mixer, coupled with means for transferring separated excess second delaminating liquid from the second flow mixer to a second settling tank;

means for removing the further delaminated shreds from the second flow mixer, communicating with means for (a) separating the further delaminated shreds from excess second delaminating liquid adhered thereto and (b) transporting the second delaminating liquid to the second settling tank;

means for separating pigments from the second delaminating liquid in the second settling tank, coupled with means for removal of separated pigments from the second settling tank;

means for recirculating delaminating liquid from the second settling tank to the second flow mixer;

means for washing and drying the further delaminated shreds which have been removed from the second flow mixer and from which further delaminated shreds second delaminating liquid has been separated therefrom;

means for recirculating third delaminating liquid from the third settling tank to the washing and drying means;

means for testing the composition of at least one delaminating liquid by potential or conductivity measurement; and means for comminuting the dried delaminated shreds followed by treatment in a plastic agglomerator.

12. Apparatus as claimed in claim 5, wherein the chambers contain motor-operated blades and baffles.

13. Apparatus as claimed in claim 5, wherein the flow mixer has, in its interior adjacent to the outer wall, coaxial perforated plates for separating the coating from the film shreds.

14. Apparatus as claimed in claim 5, wherein each of the chambers has means therein for moving the delamination composition cocurrently or countercurrently to the transport direction of the film shreds.

15. Apparatus as claimed in claim 5, wherein the flow mixer is inclined from 5 to 90° relative to the horizonal in the transport direction.

16. Apparatus as claimed in claim 5, wherein the chambers narrow in the direction of flow.

* * * * *

UNITED STATES PATENT AND TRADEMARK OFFICE
CERTIFICATE OF CORRECTION

PATENT NO. : 6,223,904 B1
DATED : May 1, 2001
INVENTOR(S) : Stephan et al.

It is certified that error appears in the above-identified patent and that said Letters Patent is hereby corrected as shown below:

Column 12,

Claim 12,
Line 35, "claim 5" should be -- claim 11 --.

Claim 13,
Line 37, "claim 5" should be -- claim 11 --.

Claim 14,
Line 42, "claim 5" should be -- claim 11 --.

Claim 15,
Line 46, "claim 5" should be -- claim 11 --.

Claim 16,
Line 49, "claim 5" should be -- claim 11 --.

Signed and Sealed this

Ninth Day of October, 2001

Attest:

*Nicholas P. Godici*

NICHOLAS P. GODICI
Attesting Officer    Acting Director of the United States Patent and Trademark Office